United States Patent [19]

Hamajima et al.

[11] Patent Number: 4,852,630
[45] Date of Patent: Aug. 1, 1989

[54] SHORT FIBER PREFORM, METHOD OF MAKING IT, AND COMPOSITE MATERIAL MANUFACTURED FROM IT

[75] Inventors: Kaneo Hamajima; Atsuo Tanaka; Masahiro Kubo; Tadashi Dohnomoto, all of Toyota, Japan

[73] Assignee: Toyota Jidosha Kabushiki Kaisha, Toyota, Japan

[21] Appl. No.: 16,499

[22] Filed: Feb. 17, 1987

Related U.S. Application Data

[63] Continuation of Ser. No. 723,757, Apr. 16, 1985, abandoned.

[30] Foreign Application Priority Data

Jan. 17, 1985 [JP] Japan ..................... 60-6576

[51] Int. Cl.$^4$ .............. B22D 19/00; B22D 25/00; B29C 43/02
[52] U.S. Cl. ..................... 164/761; 164/97; 164/98; 264/109; 264/118; 264/119; 428/610
[58] Field of Search ............. 264/119, 118, 109, 120, 264/123, 124, 125, 56, 65, 257, 293, 296, DIG. 19, DIG. 25, DIG. 59, DIG. 63, DIG. 64, DIG. 66, DIG. 75; 164/97, 98, 100, 76.1; 428/608, 610, 614

[56] References Cited

U.S. PATENT DOCUMENTS

| | | | |
|---|---|---|---|
| 1,521,483 | 12/1924 | Stevens | 164/100 X |
| 3,406,234 | 10/1968 | Bailly | 264/257 |
| 3,661,688 | 5/1972 | Wheeler | 264/119 |
| 3,816,158 | 6/1974 | Jacobs | 264/109 |
| 4,036,599 | 7/1977 | Dhingra | 428/608 |
| 4,078,030 | 3/1978 | Munk et al. | 264/109 |
| 4,080,416 | 3/1978 | Howard | 264/258 |
| 4,131,664 | 12/1978 | Flowers et al. | 264/119 |
| 4,205,123 | 5/1980 | Palmer et al. | 264/119 |
| 4,221,751 | 9/1980 | Haataja et al. | 264/119 |
| 4,248,163 | 2/1981 | Caughey | 264/119 |
| 4,407,769 | 10/1983 | Harada et al. | 264/65 |
| 4,450,207 | 5/1984 | Donomoto et al. | 428/614 |
| 4,468,272 | 8/1984 | Donomoto et al. | 156/280 |
| 4,489,138 | 12/1984 | Yamatsuta et al. | 428/614 |
| 4,543,345 | 9/1985 | Wei | 264/65 |
| 4,548,253 | 10/1985 | Funatani et al. | 164/80 |
| 4,587,177 | 5/1986 | Toaz et al. | 428/614 |

FOREIGN PATENT DOCUMENTS

| | | | |
|---|---|---|---|
| 20108281 | 5/1984 | European Pat. Off. | |
| 59-137381 | 8/1984 | Japan | 264/125 |
| 2082643 | 3/1982 | United Kingdom | |

Primary Examiner—Jan H. Silbaugh
Assistant Examiner—Mary Lynn Fertig
Attorney, Agent, or Firm—Oblon, Spivak, McClelland, Maier & Neustadt

[57] ABSTRACT

A preform for being embedded in a matrix material for making a composite material is made essentially of many short fibers stuck together by a quantity of dried binder. This preform has a first portion in which the fiber volume proportion is relatively high, a second portion in which the fiber volume proportion is relatively low, and a third portion, joining between the first portion and the second portion, in which the fiber volume proportion changes substantially continuously from its portion adjoining to the first portion to its portion adjoining to the second portion. Thereby, the characteristics of the composite material, such as its strength, heat and wear resistance, and machinability and workability and characteristics with respect to wear on a mating member, alter smoothly from the first portion to the second portion without any severe discontinuity, thus ensuring that no points of weakness are caused. A method for making such a preform, and a composit material object manufactured using such a preform, which may be an engine piston, are also disclosed.

13 Claims, 6 Drawing Sheets

SHORT FIBER PREFORM, METHOD OF MAKING IT, AND COMPOSITE MATERIAL MANUFACTURED FROM IT

This application is a continuation of application Ser. No. 723,757, filed on Apr. 16, 1986, now abandoned.

BACKGROUND OF THE INVENTION

The present invention relates to a preform, made of short fibers, for incorporation into a composite material for providing fiber reinforcement therefor; to said fiber reinforced composite material incorporating said short fiber preform, itself; and to a method for making said short fiber preform.

In order to improve the strength of materials, particularly of light metals such as aluminum or aluminum alloy, and in order to improve their heat resistance, their wear resistance, and so on, so as to allow various components made from the materials to be made lighter, it has been considered in various fields to provide fiber reinforcement such as alumina fibers as embedded in the materials. Thus, composite reinforced materials have been proposed, and utilized, composed of a matrix of metal which has been a light metal such as aluminum alloy, with embedded in it reinforcing fibers such as alumina fibers. And, particularly, short fibers have been used as such reinforcing fibers. Further, a conventional method for manufacturing such a composite reinforced material has been the pressurized casting method, in which first by the so called compression forming method or by the so called suction method a preform has been made as composed of many such short fibers such as alumina fibers stuck together by a binder, and then the matrix metal such as aluminum alloy in molten form has been poured around the preform and has been caused to permeate into its interstices under pressure.

However, with regard to a part made of such fiber reinforced composite material, there has been a basic conflict in the properties required from such a part, which has entailed compromises to be made during design. Namely, the heat resistance and the strength and the wear resistance of such a fiber reinforced composite material part are generally the greater, the greater is the amount of reinforcing fiber material incorporated therein, in other words the greater is the volume proportion of the reinforcing fibers in the preform from which the composite material is produced by the pressurized casting method as detailed above; but, on the other hand, the greater is said volume proportion of the reinforcing fibers in the preform, the more difficult does the fiber reinforced composite material become to machine—i.e. its workability decreases—and the greater becomes the amount of wear on a mating member which rubbingly slides against and cooperates with a part made from said fiber reinforced composite material. In other words, a part made from a short fiber preform which has a relatively high fiber volume proportion is relatively strong, and has relatively good heat resistance and relatively good wear resistance; but, as disadvantages, its machinability and workability are relatively poor and the rate of wear on a tool which is used for working it is relatively high, and further the amount of wear on a mating member which slidingly cooperates with said part is relatively high. On the other hand, a part made from a short fiber preform which has a relatively low fiber volume proportion is relatively weak, and has relatively poor heat resistance and relatively poor wear resistance; but, as advantages, its machinability and workability are relatively good and the rate of wear on a tool which is used for working it is relatively low, and further the amount of wear on a mating member which slidingly cooperates with said part is relatively low.

With the object of reconciling these conflicting requirements for characteristics of a part made from a short fiber reinforced material, it has been observed that typically different requirements are made of the different portions of such a part, and accordingly a solution which has been practiced has been to make the short fiber preform from which the part is made in different portions which are of different volume proportions. Thereby, one portion of the short fiber preform is made to be of a high volume proportion, and this portion of the short fiber preform, when the matrix metal has been infiltrated thereinto and when the finished part has been machined, constitutes a portion of said finished part which is demanded to be of relatively high strength and relatively high heat resistance and relatively high wear resistance, but which is not required to have particularly good characteristics with regard to wear on a mating or cooperating member, or machinability or workability; while, on the other hand, another portion of the short fiber preform is made to be of a low volume proportion, and this portion of the short fiber preform, when the matrix metal has been infiltrated thereinto and when the finished part has been machined, constitutes a portion of said finished part which is not particularly demanded to be of relatively high strength or relatively high heat resistance or relatively high wear resistance, but which is required to have good characteristics with regard to wear on a mating or cooperating member, and which is required to have good machinability and workability.

However, in the prior art this solution has been of limited applicability. It has been practiced to form the short fiber preform in two separate parts of radically different fiber volume proportions, in order as outlined above to obtain acceptable characteristics from the different portions of a finished part made from composite material incorporating the preform, but the problem arises that, when a first short fiber preform portion (typically made by the compression forming method) having relatively high volume proportion is assembled together with a second short fiber preform portion (typically made by the suction method) having relatively low volume proportion, and when a composite material is made from these two conjoined preform portions and a part is made from the composite material, there is a sudden discontinuous change in the fiber volume proportion at the boundary between the first and the second preform portions, and further there are no reinforcing fibers spanning between these portions, in other words there is inevitably at least a small gap between these portions made substantially only of matrix metal. Further, there is a sudden discontinuous change in the thermal properties of the composite material, such as the thermal expansion coefficient and the thermal conductivity, at the aforesaid boundary. This means that, if the finished part is subjected to severe stresses, and in particular if said finished part is subjected to repeated cyclic application of load or is subjected to a repeated hot and cold cycle, there is a strong likelihood of fracturing occurring between the two portions of said finished part at the boundary defined between the two preform portions. This problem in fact also tends to occur with a part made out of a material which is composite reinforced only in one local portion thereof. Further, such a method for making a composite material out of a pair of conjoined preform portions is by its nature inefficient.

SUMMARY OF THE INVENTION

Now, in order to overcome these difficulties outlined above, it might be conceived of to manufacture an integral short fiber preform with different portions of it of different fiber volume proportions. However, this is not easy to accomplish by methods such as the compression forming method or the suction method, because these methods do not by themselves provide any ready means for varying the fiber volume proportion of the preform in its different portions. Particularly, the compression forming method is well suited to the manufacture of a short fiber preform of relatively high fiber volume proportion, with the object of providing high strength and high heat resistance and high wear resistance, at the expense of workability and machinability and wear characteristics on a mating member; but it is difficult with the compression forming method to manufacture a short fiber preform of relatively low fiber volume proportion which has good workability and machinability and good wear characteristics on a mating member. On the other hand, the suction method is well suited to the manufacture of a short fiber preform of relatively low fiber volume proportion, with the object of providing good workability and good machinability and good wear characteristics on a mating member, at the expense of strength and heat resistance and wear resistance; but it is difficult with the suction method to manufacture a short fiber preform of relatively high fiber volume proportion which has high strength and heat resistance and wear resistance. Further, in the hypothetical case that it were in fact possible to manufacture an integral short fiber preform with different portions of it being of different fiber volume proportions, if the boundary between these different portions were a sudden boundary, in other words if the fiber volume proportion altered substantially discontinuously at this boundary, even if the short fibers in fact extended across this boundary and were not actually interrupted at it, still the problem detailed above would arise of proneness to fracturing of a finished part made from the preform at the boundary, in the event of said finished part being subjected to repeated cyclic application of load or being subjected to a repeated hot and cold cycle.

Accordingly, it is the primary object of the present invention to provide a preform made from short fibers, and a method for making it, which avoid the above detailed problems.

It is a further object of the present invention to provide such a preform made from short fibers, and a method for making it, which has one portion made with a relatively high fiber volume proportion and another portion made with a relatively high volume proportion, while avoiding any problems such as those mentioned above.

It is a further object of the present invention to provide such a preform made from short fibers, and a method for making it, which has no sharp boundary between said two portions with different fiber volume proportions.

It is a further object of the present invention to provide such a preform made from short fibers, and a method for making it, which has no discontinuity of the reinforcing fibers between said two portions with different fiber volume proportions.

It is a further object of the present invention to provide such a preform made from short fibers, and a method for making it, which can be controlled accurately with regard to its shape and its fiber volume proportion.

It is a further object of the present invention to provide such a preform made from short fibers, and a method for making it, which can be thus accurately controlled, even if the short fibers of which it is made have relatively high elasticity.

It is a yet further object of the invention to provide a short fiber type composite material, which has good strength in the appropriate portions thereof.

It is a yet further object of the present invention to provide a short fiber type composite material, which has good wear resistance in the appropriate portions thereof.

It is a yet further object of the present invention to provide a short fiber type composite material, which has good heat resistance in the appropriate portions thereof.

It is a yet further object of the present invention to provide a short fiber type composite material, which has good workability in the appropriate portions thereof.

It is a yet further object of the present invention to provide a short fiber type composite material, which has good machinability in the appropriate portions thereof.

It is a yet further object of the present invention to provide a short fiber type composite material, which has good characteristics with regard to wear on a mating and cooperating member in the appropriate portions thereof.

It is a yet further object of the present invention to provide a short fiber type composite material, which is suitable for manufacturing parts which are required to be as light as possible.

It is a yet further object of the present invention to provide a short fiber type composite material, which can be manufactured efficiently.

It is a yet further object of the present invention to provide a short fiber type composite material, which can be manufactured at low cost.

It is a yet further object of the present invention to provide a short fiber type composite material, which has several parts with different fiber volume proportions, but has no sudden or discontinuous changes in fiber volume proportion.

It is a yet further object of the present invention to provide a short fiber type composite material, which has several parts with different fiber volume proportions, but has no discontinuities in the fibers spanning between said several parts.

It is a yet further object of the present invention to provide a short fiber type composite material, which has several parts with different fiber volume proportions, but has no sudden changes in thermal characteristics such as thermal expansion coefficient or thermal conductivity between said several parts.

It is a yet further object of the present invention to provide a short fiber type composite material, which is not liable to fracture when subjected to repeated load cycles.

It is a yet further object of the present invention to provide a short fiber type composite material, which is not liable to fracture when subjected to repeated temperature cycles.

According to the most general preform aspect of the present invention, these and other objects are accomplished by a preform for being embedded in a matrix material for making a composite material, composed essentially of many short fibers stuck together by a quantity of dried binder, comprising: (a) a first portion in which the fiber volume proportion is relatively high; (b) a second portion in which the fiber volume proportion is relatively low; and (c) a third portion, joining between said first portion and said second portion, in which the fiber volume proportion changes substantially continuously from its portion adjoining to said first portion to its portion adjoining to said second portion.

According to such a structure, the portion of the composite material in which said first portion of the preform is embedded has relatively high strength and heat resistance and wear resistance, but on the other hand has poor workability and machinability, and relatively poor characteristics with regard to wear on a mating member. On the other hand, the portion of the composite material in which said second portion of the preform is embedded has relatively good workability and machinability, and relatively good characteristics with regard to wear on a mating member, but on the other hand has relatively low strength and heat resistance and wear resistance. And, because of the provision of the transitional third portion, which smoothly links the first portion to the second portion without any sudden change in fiber volume proportion occurring between them, it is ensured that in the resulting composite material there are no portions in which the physical characteristics such as the strength and the modulus of elasticity and the coefficient of thermal expansion and the thermal conductivity undergo sudden changes, so that the composite material does not have weak points or surfaces prone to fracture caused when the material undergoes repeated stresses or repeated cycles of hot and cold temperatures. Thereby, the resulting short fiber type composite material has good strength and wear resistance and heat resistance in certain appropriate portions thereof, while also having good workability and machinability and good characteristics with regard to wear on a mating and cooperating member in certain other appropriate portions thereof. Accordingly, this composite material is suitable for making parts which are required to be as light as possible.

And, according to the most general method aspect of the present invention, these and other objects are accomplished by a method for making a preform for being embedded in a matrix material for making a composite material composed essentially of many short fibers stuck together by a quantity of dried binder, comprising the steps, in the specific sequence, of: (a) preparing a mixture of a quantity of said short fibers with said binder in the unhardened state, to form an at least partly moist mass; (b) compressing a proper portion of said moist mass by an amount substantially greater than the remainder of said moist mass is compressed; and (c) hardening the binder in said moist mass.

According to such a method, the first portion of the preform as defined above is constituted by the compressed portion of said moist mass, while the second portion of said preform is constituted by said remainder of said moist mass, and the third or transitional portion of said preform is constituted by the portion of said moist mass which is transitional between said compressed portion and said remainder thereof. Thereby, the preform may be made economically and efficiently at low cost.

The binder used in this invention may be of various types, but in order to avoid problems arising in the course of the manufacture of composite material using the pressurized casting method, and so that the binder can be easily and rapidly hardened, it is preferable to use an inorganic binder, such as colloidal silica or alumina, which can be easily hardened by drying. Further, in order to ensure that the drying of the binder does not cause any very great changes in the fiber volume proportion of the preform, it is preferable that, at the stage of compressing the aforementioned proper portion of the moist fiber mass, the binder should be in the partially dried state. Yet further, the step (c) of hardening the binder may be carried out after the application of compression in the step (b) has been released, but in order to maintain the appropriate compression situation of the proper portion of the preform, particularly when the fibers which are used have a high elasticity, it is preferable that the compression pressure of step (b) should be maintained during the hardening of step (c).

Finally, according to the most general composite material aspect of the present invention, these and other objects are accomplished by an object made of composite material, comprising a portion composed essentially of a matrix material reinforced by many short fibers embedded in it, comprising: (a) a first portion in which the fiber volume proportion is relatively high; (b) a second portion in which the fiber volume proportion is relatively low; and (c) a third portion, joining between said first portion and said second portion, in which the fiber volume proportion changes substantially continuously from its portion adjoining to said first portion to its portion adjoining to said second portion.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figures; and:

DESCRIPTION OF THE PREFERRED EMBODIMENTS

The present invention will now be described with reference to the preferred embodiments thereof, and with reference to the appended drawings.

THE FIRST PREFERRED EMBODIMENT

A quantity of short alumina fibers of type "Safiru" (this is a trademark) made by ICI KK, of average fiber length about 5 mm and average fiber diameter about 2 to 3 microns, was added to a quantity of binder of colloidal silica containing about 10% of $SiO_2$, and after the mixture had been adequately stirred up a block 2 of alumina fibers was formed therefrom by the suction method. This block 2, which can be seen in a cross sectional view in FIG. 1, had a low fiber volume proportion of about 5%, and was roughly cuboidal and had dimensions of about 200 mm length by 80 mm width by 30 mm thickness; further, the short alumina fibers of which this block 2 was composed were layered in planes parallel to the 200 mm by 80 mm faces thereof and were oriented substantially randomly in these planes. At this stage the block 2 was still in the wet state, not particularly dried out.

Figure 1:
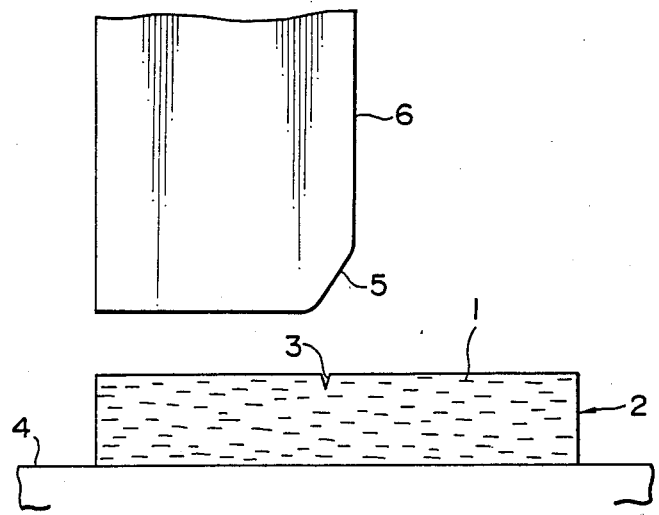
FIG. 1 is a schematic sectional view, relating to the first through the third preferred embodiments of the present invention, showing a block of short fibers for making an embodiment of the short fiber preform according to the present invention, as placed on a base with a press punch in position as ready to compress a portion of said short fiber block.

Next, a slot 3 was cut in the top surface of the block 2 as seen in FIG. 1, i.e. in one of its 200 mm by 80 mm faces extending parallel to the 80 mm side thereof and about halfway across said face, and of depth about 3 mm. And then the block 2 was placed into a drying oven and was heated up to and maintained at a temperature of 100° C. for about 30 minutes, so that the silica binder was partially dried.

Next, as also shown in FIG. 1, the thus partially dried out block 2 was placed onto a base 4, and a pressure punch 6, which had a generally flat bottom surface with a chamfer or tapered away portion 5 on one side thereof, was pressed downwards against one portion of said block 2 on one side of the groove 3, with an applied pressure of about 30 kg/cm², so as to compress said approximately half side portion of the block 2. Then, after withdrawing the punch 6 so that the compression force applied to the block 2 was released, at which time the configuration as deformed by said compression force of the block 2 did not substantially further alter, the thus compression deformed block 2 was again placed in the drying oven and the binder was completely dried, so that the configuration and shape of the block 2 were completely stabilized.

Figure 2:
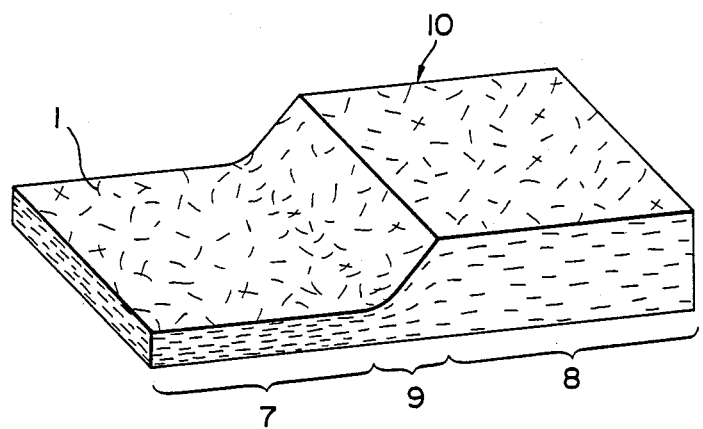
FIG. 2 is a perspective view of said embodiment of the short fiber preform according to the present invention, made from the FIG. 1 short fiber block.

Thus, according to the first preferred embodiment of the method aspect of the present invention as described above, there was manufactured a short fiber preform 10 which was the first preferred embodiment of the preform aspect of the present invention, as shown in FIG. 2 in perspective view. This short fiber preform 10 was made up of: a first compressed portion, denoted in FIG. 2 by the reference numeral 7, with length somewhat less than 100 mm and width about 80 mm, which had been compressed by about three times by the main flat bottom surface of the punch 6 and thus had thickness about 10 mm and a fiber volume proportion of about 15%; a second non compressed portion, denoted in FIG. 2 by the reference numeral 8, also with length somewhat less than 100 mm and width also about 80 mm, which had not been substantially compressed by the punch 6 and thus still had thickness about 30 mm and a fiber volume proportion of about 5%; and a transitional portion, denoted in FIG. 2 by the reference numeral 9, located between said compressed portion 7 and said non compressed portion 8, with fairly short dimension in the length direction and with width also about 80 mm, which had been compressed by an amount which varied continuously along its length dimension from about unity to about three times by the chamfered or tapered surface 5 of the punch 6 and thus had thickness varying continuously from about 30 mm to about 10 mm and a fiber volume proportion varying continuously from about 5% to about 15%. Thus, the transitional portion 9 provided a smooth and continuous and gradual transition between the compressed portion 7 and the non compressed portion 8. Absolutely no problem occurred of fracturing or of fiber disorientation in the short fiber preform 10, even in the transitional portion 9 thereof, or in the boundaries between said transitional portion 9 and the compressed portion 7 and the non compressed portion 8. This matter is thought to have been substantially promoted by the provision of the groove 3, which is thought, by provision of additional surface area for the top surface of the preform 10, to have relieved and problem of possible tearing of the short fibers on and around said top surface; however, the provision of this groove, although helpful for the present invention, is not essential, but is a useful specialization thereof.

Figure 3:
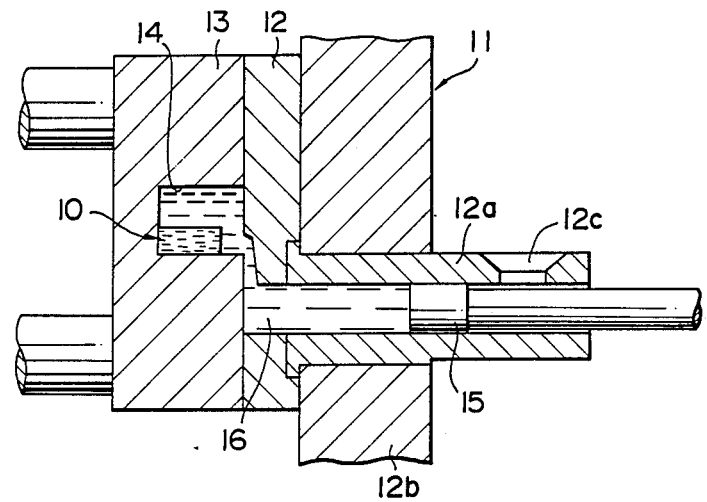
FIG. 3 is a schematic vertical sectional view taken through a die-cast casting device used for producing a composite material according to the present invention incorporating the preform shown in FIG. 2.

FIG. 3 is a schematic vertical sectional view taken through a die-cast casting device 11 which was used for producing a composite material incorporating the preform 10 of FIG. 2. In this figure, the reference symbol 12b denotes a die fitting plate, to which are fixed a casting sleeve 12a and a fixed die 12. This die casting device functions as follows. The fixed die 12 cooperates with a movable die 13 which is reciprocated to and fro in the horizontal direction as seen in FIG. 3 by a ram device or the like not shown in the figure, and a mold cavity 14 is defined by this cooperation of the fixed die 12 and the movable die 13. A plunger 15 fixed at the end of a plunger rod cooperates with a cylindrical hole formed in the casting sleeve 12a, and the plunger rod and the plunger 15 can be selectively pressed leftwards as seen in the figure by a means, also not shown, so as to apply pressure to a quantity 16 of molten metal which is being received in the mold cavity 14 as surrounding a preform 10 made of porous material previously placed in said mold cavity 14 (this quantity 16 of molten metal is first poured into the mold cavity 14 through a hole 12c pierced through the upper side of the casting sleeve 12a). When the quantity 16 of molten metal has solidified, the resulting cast piece is removed from the mold cavity 14, after the plunger rod and the plunger 15 have been withdrawn, by separating the fixed die 12 and the movable die 13, with the aid of a knock out pin not shown in the figure.

Using a die-cast casting device of the above type, a composite material according to the first preferred embodiment of the composite material aspect of the present invention was made as follows. After the preform 10 shown in FIG. 2, made of alumina short fibers, the composition and manufacture of which have been described above, had been heated up to 600° C. at atmospheric pressure, said preform 10 was placed into the mold cavity 14 of the movable die 13 with a floating prevention weight, not shown in the figures, attached to it, and then a quantity 16 of molten metal for serving as a matrix metal, in the case of this first preferred embodiment being molten aluminum alloy of JIS (Japanese Industrial Standard) AC8A and being heated to about 720° C., was poured into the mold cavity 14 over and around the preform 10. Then the plunger rod and the pluner 15, which closely cooperated with the inner cylindrical surface of the casting sleeve 12a, were forced inwards, so as to pressurize the molten aluminum alloy metal mass 16 to a pressure of about 500 kg/cm$^2$ and thus to force it into the interstices between the short alumina fibers making up the preform 10. The pressure of about 500 kg/cm$^2$ was maintained until the mass 16 of molten aluminum alloy metal was completey solidified, and then the resultant cast form was removed from the mold cavity 14 by separating the fixed die 12 and the movable die 13, and by the use of the knock out pin not shown in the drawing. Finally, the part of this cast form which consisted only of aluminum alloy metal was machined away, and from the part of said cast form in which the short fiber preform 10 had been embedded were cut two test sample pieces of composite material, being aluminum alloy in which short alumina fibers were dispersed, one of them designated as "A" being cut from the portion of the composite material which incorporated the compressed portion 7 of the preform 10 which had had fiber volume proportion of about 15%, and the other of them designated as "B" being cut from the portion of te composite material which incorporated the non compressed portion 8 of the preform 10 which had had fiber volume proportion of about 5%.

Figure 4:
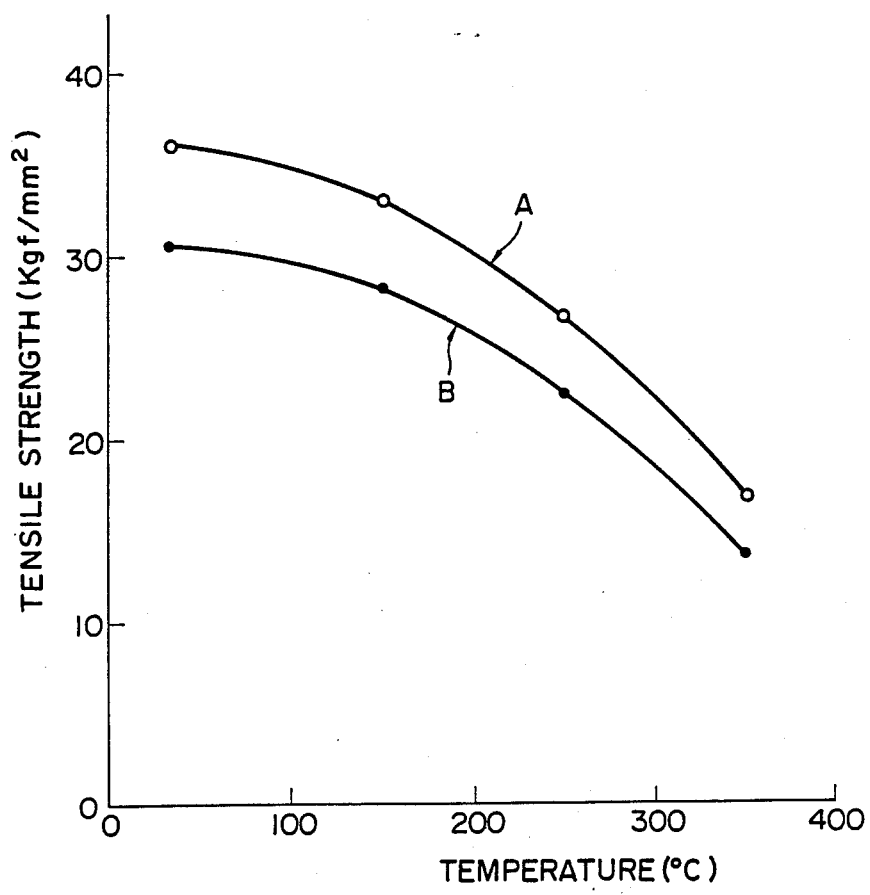
FIG. 4 is a graph, relating to the first preferred embodiment, and relating to composite material pieces of two different fiber volume proportions, in which tensile strength of said composite material in kg/mm² is shown along the vertical axis and temperature in degrees Celsius is shown along the horizontal axis.

From each of these sample pieces "A" and "B" four tensile strength test samples were cut, and the tensile strengths of these four samples were tested at various temperatures. The results of these tensile strength tests are shown in FIG. 4, which is a graph in which tensile strength in kg/mm$^2$ is shown along the vertical axis and temperature in degrees Celsius is shown along the horizontal axis. From this graph it will be understood that the portions such as "A" of the composite material which incorporated parts of the compressed portion 7 of the preform 10 which had had fiber volume proportion of about 15% had substantially higher tensile strength, than did the portions such as "B" of the composite material which incorporated parts of the non compressed portion 7 of the preform 10 which had had fiber volume proportion of about 5%. It was also verified, by experiments not particularly detailed herein, that said portions such as "A" of the composite material which incorporated parts of the compressed portion 7 of the preform 10 which had had fiber volume proportion of about 15% had substantially better heat resistance, than did the portions such as "B" of the composite material which incorporated parts of the non compressed portion 7 of the preform 10 which had had fiber volume proportion of about 5%. However, it was also demonstrated, again by experiments not particularly detailed herein, that said portions such as "B" of the composite material which incorporated parts of the non compressed portion 8 of the preform 10 which had had fiber volume proportion of about 5% had substantially better machinability, than did the portions such as "A" of the composite material which incorporated parts of the compressed portion 8 of the preform 10 which had had fiber volume proportion of about 15%.

Accordingly, it is seen that according to the present invention there has been provided the short fiber preform 10 of FIG. 2, and a method for making it, which avoid the problems with regard to the prior art detailed in the portion of this specification entitled "Background of the Invention", while having one preform portion 7 made with a relatively high fiber volume proportion and another preform portion 8 made with a relatively low fiber volume proportion. This is done by ensuring that the preform 10 has no sharp boundary between its said two portions 7 and 8 with different fiber volume proportions, and no discontinuity of the reinforcing fibers between said two portions 7 and 8 with different fiber volume proportions. Thus, it is ensured that the resulting short fiber type composite material has good strength and good wear resistance and good heat resistance in some appropriate portions thereof, while at the same time having good workability and good machinability and good characteristics with regard to wear on a mating and cooperating member in some appropriate portions thereof. For this reason, this composite material is particularly suitable for manufacturing parts which are required to be as light as possible. Yet further, because the process of manufacturing the preform is simple and easy, this composite material can be manufactured efficiently and at low cost. Also, because of the smooth and continuous transition between the portion 7 of the preform 10 which is compressed and thus has a high fiber volume proportion and the portion 8 of the preform 10 which is not compressed and thus has a low fiber volume proportion, via the transitional portion 9, thereby the resulting short fiber type composite material, while having several parts with different fiber volume proportions as appropriate, has no sudden changes in thermal characteristics such as thermal expansion coefficient or thermal conductivity between said several parts, as well as having continuity of the reinforcing short fibers between said several parts, and accordingly is not liable to fracture when subjected to repeated load cycles or repeated hot and cold cycles. Yet further, because the material for the preform 10 is partly dried before it is compressed as detailed above, and because it is held together a binder made of an inorganic material such as colloidal silica, the preform is not liable to distortion during manufacture, and can be controlled accurately with regard to its shape and its fiber volume proportion, even if the short fibers of which it is made (such as alumina fibers) have relatively high elasticity.

THE SECOND PREFERRED EMBODIMENT

A quantity of short carbon fibers of type "Toreka M40" (this is a trademark) made to Tore KK, cut to a fiber length of about 10 mm and of average fiber diameter about 7 microns, was added to a quantity of binder, and after the mixture had been adequately stirred up in the same way as in the first preferred embodiment detailed above a block 2 of carbon fibers in the still wet undried state was formed therefrom as shown in cross section in FIG. 1, having a low fiber volume proportion of about 6%, and being roughly cuboidal and having dimensions of about 200 mm length by 80 mm width by 30 mm thickness. Next, a slot 3 was cut in the top surface of the block 2 as before, as also shown in FIG. 1, i.e. in one of its 200 mm by 80 mm faces extending parallel to the 80 mm side thereof and about halfway across said face, and of depth about 3 mm. In this case, however, the block 2 was not particularly dried at this stage. Next, as also shown in FIG. 1, the still wet block 2 was placed onto a base 4, and a pressure punch 6 of the same type as before was pressed downwards against one portion of said block 2 on one side of the groove 3, so as to compress said approximately half side portion of the block 2; and, without withdrawing the punch 6 in this case, so that the compression force applied to the block 2 was not at all released, the thus compressed end deformed block 2 was placed in a drying oven and the binder was completey dried, so that the configuration and shape of the block 2 were completely stabilized; and only then was the compression load on the block 2 released. Thus, according to the second preferred embodiment of the method aspect of the present invention as described above, there was manufactured a short fiber preform 10 which was the second preferred embodiment of the preform aspect of the present invention, again of the type as shown in FIG. 2 in perspective view. This short fiber preform 10 was made up of: a first compressed portion 7, with length somewhat less than 100 mm and width about 80 mm, which had been compressed by about three times by the main flat bottom surface of the punch 6 and thus had thickness about 10 mm and a fiber volume proportion of about 18%; a second non compressed portion 8, also with length somewhat less than 100 mm and width also about 80 mm, which had not been substantially compressed by the punch 6 and thus still had thickness about 30 mm and a fiber volume proportion of about 6%; and a transitional portion 9, located between said compressed portion 7 and said non compressed portion 8, with fairly short dimension in the lenth direction and with width also about 80 mm, which had been compressed by an amount which varied continuously along its length dimension from about unity to about three times by the chamfered or tapered surface 5 of the punch 6 and thus had thickness varying continuously from about 30 mm to about 10 mm and a fiber volume proportion varying continuously from about 6% to about 18%. Thus, the transitional period 9, again, provided a smooth and continuous and gradual transition between the compressed portion 7 and the non compressed portion 8. Absolutely no problem occurred of fracturing or of fiber disorientation in the short fiber preform 10, even in the transitional portion 9 thereof, or in the boundaries between said transitional portion 9 and the compressed portion 7 and the non compressed portion 8. Again, this matter is thought to have been substantially promoted by the (optional but desirable for the present invention) provision of the groove 3, by provision of additional surface area for the top surface of the preform 10, thus relieving possible tearing of the short fibers on and around said top surface.

Using a die-cast casting device of the FIG. 3 type, a composite material according to the second preferred embodiment of the composite material aspect of the present invention was made as follows. After the preform 10, as shown in FIG. 2, made of carbon short fibers, the composition and manufacture of which have been described above, had been heated up to 700° C. in a vacuum, said preform 10 was placed into the mold cavity 14 of the movable die 13 with a floating preventing weight, not shown in the figures, attached to it, and then a quantity 16 of molten metal for serving as a matrix metal, in the case of this second preferred embodiment being molten magnesium alloy of JIS (Japanese Industrial Standard) AZ91A and being heated to about 650° C., was poured into the mold cavity 14 over and around the preform 10. Then the plunger rod and the plunger 15 were forced inwards, so as to pressurize the molten magnesium alloy metal mass 16 to a pressure of about 500 kg/cm$^2$ and thus to force it into the interstices between the short carbon fibers making up the preform 10. The pressure of about 500 kg/cm$^2$ was maintained until the mass 16 of molten magnesium alloy metal was completely solidified, and then the resultant cast form was removed from the mold cavity 14 by separating the fixed die 12 and the movable die 13, and by the use of the knock out pin not shown in the drawing. Finally, the part of this cast form which consisted only of magnesium alloy metal was machined away, and from the part of said cast form in which the short carbon fiber preform 10 had been embedded were cut various test sample pieces of composite material, being magnesium alloy in which short carbon fibers were dispersed, some of said test sample pieces being cut from the portion of the composite material which incorporated the compressed portion 7 of the preform 10 which had had fiber volume proportion of about 18%, and others of them being cut from the portion of the composite material which incorporated the non compressed portion 8 of the preform 10 which had had fiber volume proportion of about 6%. These sample pieces were tested with regard to strength and with regard to thermal expansion coefficient, and it was determined that the portions of the composite material which incorporated parts of the compressed portion 7 of the preform 10 which had had fiber volume proportion of about 18% had substantially higher strength and substantially lower thermal expansion coefficient, than the portions of the composite material which incorporated parts of the non compressed portion 7 of the preform 10 which had had fiber volume proportion of about 6%.

Accordingly, again, it is seen that according to the present invention there has been provided another type of short fiber preform, and a method for making it, which avoid the problems with regard to the prior art, while having one preform portion 7 made with a relatively high fiber volume proportion and another preform portion 8 made with a relatively low fiber volume proportion, by ensuring that the preform 10 has no sharp boundary between its said two portions 7 and 8 with different fiber volume proportions, and no discontinuity of the reinforcing fibers between said two portions 7 and 8 with different fiber volume proportions. Thus, it is ensured that the resulting short fiber type composite material has good strength and good wear resistance and good heat resistance in some appropriate portions thereof, while at the same time having good workability and good machinability and good characteristics with regard to wear on a mating and cooperating member in some appropriate portions thereof, and thus is particularly suitable for manufacturing parts which are required to be as light as possible; and it is ensured that this composite material has no sudden changes in thermal characteristics between its several parts, as well as having continuity of the reinforcing short fibers between said several parts, and accordingly is not liable to fracture when subjected to repeated load cycles or temperature cycles.

THE THIRD PREFERRED EMBODIMENT

A quantity of short potassium titanate fibers of type "Tisumo D" (this is a trademark) made by Otsuka Kagaku KK, of average fiber length about 25 microns and of average fiber diameter about 0.3 microns, was added to a quantity of about 80 cm$^3$ of binder of colloidal silica containing about 10% of $SiO_2$, and after the mixture had been adequately stirred up, in the same way as in the first preferred embodiment detailed above, a block 2 of potassium titanate fibers in the still wet undried state was formed by the compression forming method therefrom as shown in cross section in FIG. 1, having a low fiber volume proportion of about 10%, and being roughly cuboidal and again having dimensions of about 200 mm length by 80 mm width by 30 mm thickness. And then the block 2 was placed into a drying oven and was heated up to and maintained at a fairly high temperature for some considerable time, so that the silica binder was partially dried.

Next, with a slot 3 cut in the top surface of the block 2 as before, as shown in FIG. 1, i.e. in one of its 200 mm by 80 mm faces extending parallel to the 80 mm side thereof and about halfway across said face, and of depth about 3 mm, then, as also shown in FIG. 1, the now partially dried block 2 was placed onto a base 4, and a pressure punch 6 of the same type as before was pressed downwards against one portion of said block 2 on one side of the groove 3, so as to compress said approximately half side portion of the block 2; Then, after in this case withdrawing the punch 6 so that the compression force applied to the block 2 was released, at which time the configuration as deformed by said compression force of the block 2 did not substantially further alter, the thus compression deformed block 2 was again placed in the drying oven and the binder was completely dried, so that the configuration and shape of the block 2 were completely stabilized. Thus, according to the third preferred embodiment of the method aspect of the present invention as described above, there was manufactured a short fiber preform 10 which was the third preferred embodiment of the preform aspect of the present invention, again of the type as shown in FIG. 2 in perspective view. This short fiber preform 10 was again made up of: a first compressed portion 7, with length somewhat less than 100 mm and width about 80 mm, which had been compressed by about three times by the main flat bottom surface of the punch 6 and thus had thickness about 10 mm and a fiber volume proportion of about 30%; a second non compressed portion 8, also with length somewhat less than 100 mm and width also about 80 mm, which had not been substantially compressed by the punch 6 and thus still had thickness about 30 mm and a fiber volume proportion of about 10%; and a transitional portion 9, located between said compressed portion 7 and said non compressed portion 8, with fairly short dimension in the length direction and with width also about 80 mm, which had been compressed by an amount which varied continuously along its length dimension from about unity to about three times by the chamfered or tapered surface 5 of the punch 6 and thus had thickness varying continuously from about 30 mm to about 10 mm and a fiber volume proportion varying continuously from about 10% to about 30%. Thus, the transitional portion 9, again, provided a smooth and continuous and gradual transition between the compressed portion 7 and the non compressed portion 8. Again, absolutely no problem occurred of fracturing or of fiber disorientation in the short fiber preform 10, even in the transitional portion 9 thereof, or in the boundaries between said transitional portion 9 and the compressed portion 7 and the non compressed portion 8. Again, this matter is thought to have been substantially promoted by the (optional but desirable for the present invention) provision of the groove 3, by provision of additional surface area for the top surface of the preform 10, thus relieving possible tearing of the short fibers on and around said top surface.

Again using a die-cast casting device of the FIG. 3 type, a composite material according to the third preferred embodiment of the composite material aspect of the present invention was made as follows. After the preform 10, as shown in FIG. 2, made of potassium titanate short fibers, the composition and manufacture of which have been described above, had been heated up to 700° C. in the atmosphere, said preform 10 was placed into the mold cavity 14 of the movable die 13 with a floating prevention weight, not shown in the figures, attached to it, and then a quantity 16 of molten metal for serving as a matrix metal, in the case of this third preferred embodiment being molten aluminum alloy of JIS (Japanese Industrial Standard) AC1A and being heated to about 720° C., was poured into the mold cavity 14 over and around the preform 10. Then the plunger rod and the plunger 15 were forced inwards, so as to pressurize the molten aluminum alloy metal mass 16 to a pressure of about 50 kg/cm$^2$ and thus to force it into the interstices between the short potassium titanate fibers making up the preform 10. The pressure of about 500 kg/cm$^2$ was maintained until the mass 16 of molten aluminum alloy metal was completely solidified, and then the resultant cast form was removed from the mold cavity 14 by separating the fixed die 12 and the movable die 13, and by the use of the knock out pin, not shown.

Finally, the part of this cast form which consisted only of aluminum alloy metal was machined away, and from the part of said cast form in which the short potassium titanate fiber preform 10 had been embedded were cut various test sample pieces of composite material, being aluminum alloy in which short potassium titanate fibers were dispersed, some of said test sample pieces being cut from the portion of the composite material which incorporated the compressed portion 7 of the preform 10 which had had fiber volume proportion of about 30%, and others of them being cut from the portion of the composite material which incorporated the non compressed portion 8 of the preform 10 which had had fiber volume proportion of about 10%. These sample pieces were tested with regard to thermal conductivity, and it was determined that the portions of the composite material which incorporated parts of the compressed portion 7 of the preform 10 which had had high fiber volume proportion of about 30% had substantially lower thermal conductivity, i.e. had better thermal insulation properties, than the portions of the composite material which incorporated parts of the non compressed portion 7 of the preform 10 which had had low fiber volume proportion of about 10%.

Accordingly, again, it is seen that according to the present invention there has been provided another type of short fiber preform, and a method for making it, which avoid the problems with regard to the prior art, while having one preform portion 7 made with a relatively high fiber volume proportion and another preform portion 8 made with a relatively low fiber volume proportion, again by ensuring that the preform 10 has no sharp boundary between its said two portions 7 and 8 with different fiber volume proportions, and by preventing the occurrence of any substantial discontinuity of the reinforcing fibers between said two portions 7 and 8 with different fiber volume proportions. Thus, it is ensured that the resulting short fiber type composite material has good strength and good wear resistance and good heat resistance in some appropriate portions thereof, while at the same time having good workability and good machinability and good characteristics with regard to wear on a mating and cooperating member in some appropriate portions thereof, and thus is particularly suitable for manufacturing parts which are required to be as light as possible; and it is ensured that this composite material has no sudden changes in thermal characteristics between its several parts, as well as having continuity of the reinforcing short fibers between said several parts, and accordingly is not liable to fracture when subjected to repeated load cycles or temperature cycles.

FURTHER TESTS ON EMBODIMENTS ONE THROUGH THREE

From the composite material pieces prepared as described above, according to Embodiments One, Two, and Three of the composite material aspect of the present invention, there were next cut certain test sample pieces of composite material, each aligned in the longitudinal direction of the original short fiber preform, and each of them having a first portion cut from the portion of the composite material piece which incorporated the compressed portion 7 of the relevant preform 10 which had been compressed and had had high fiber volume proportion, a second portion cut from the portion of said composite material which incorporated the non compressed portion 8 of said relevant preform 10 which had not been compressed and had had low fiber volume proportion, and a transitional portion cut from the portion of said composite material which incorporated the transitional portion 9 of said relevant preform 10 which had been compressed to a varying amount along its longitudinal direction and had fiber volume proportion varying from low to high in a continuous manner along said longitudinal direction. These sample pieces were tested with regard to bending strength, in comparison to comparison samples cut from composite materials of the prior art type detailed above in the portion of this specification entitled "Background of the Invention" which were made from preform assemblies made of two separate and abutted preform pieces one of which had high fiber volume proportion and the other of which had low fiber volume proportion with substantially no transitional portion being provided between them, and it was determined that the samples of the composite materials according to the above described first three preferred embodiments of the present invention had clearly superior bending strength in their said transitional portions which were cut from the portions of said composite materials which incorporated the transitional portions 9 of the relevant preforms 10 which had been compressed to a continuously varying amount along their longitudinal directions and had fiber volume proportion varying from low to high in a continuous manner along said longitudinal directions. It is believed that this is because the comparison samples had sudden alterations in fiber volume proportion between their portions cut from the portions of the composite material pieces which incorporated the compressed portions 7 of the relevant preforms 10 which had been compressed and had had high fiber volume proportion and their portions cut from the portions of said composite materials which incorporated the non compressed portions 8 of said relevant preforms 10 which had not been compressed and had had low fiber volume proportion, in contrast to the samples of composite materials according to the present invention.

THE FOURTH PREFERRED EMBODIMENT (ENGINE PISTON)

A quantity of short alumina-silica fibers of type "Kaouuru" (this is a trademark) made by Isolite Babcock Taika KK, of average fiber length about 2 mm and average fiber diameter about 2 to 3 microns, was added to a quantity of binder of colloidal alumina containing about 10% of $Al_2O_3$, and after the mixture had been adequately stirred up a block 18 of alumina-silica fibers was formed therefrom by the suction method. This block 18, which can be seen in a cross sectional view in FIG. 5, had a low fiber volume proportion of about 7%, and was roughly cylindrical and had dimensions of about 94 mm diameter by 20 mm thickness; further, the short alumina-silica fibers of which this block 18 was composed were layered in planes parallel to the circular end faces thereof and were oriented substantially randomly in these planes. At this stage the block 18 was still in the wet state, not particularly dried out. Next, the block 18 was placed into a drying oven and was heated up to and maintained at a temperature of about 100° C. for about 30 minutes, so that the alumina binder was partially dried.

Figure 5:
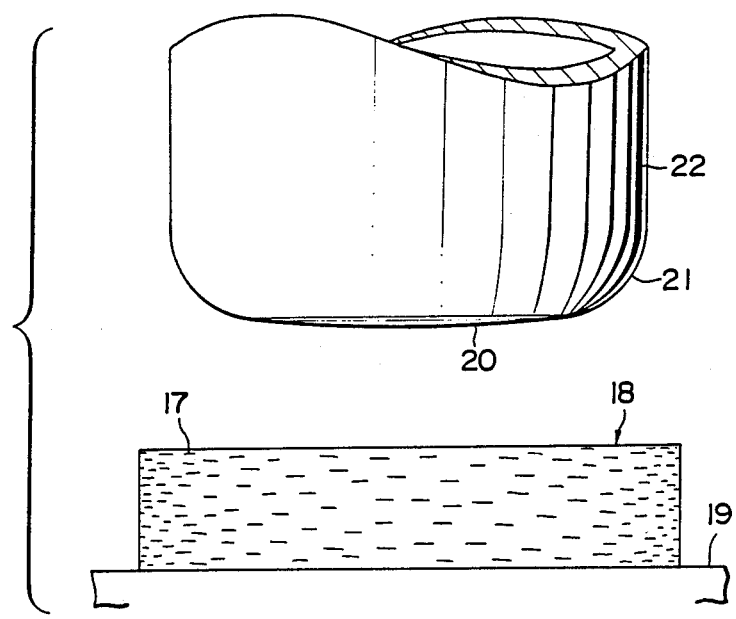
FIG. 5 is a schematic view, similar to FIG. 1 but relating to the fourth and fifth preferred embodiments of the present invention, showing in cross section a cylindrical block of short fibers for making an embodiment of the short fiber preform according to the present invention, as placed on a base with a press punch (shown in side view) in position as ready to compress a portion of said cylindrical short fiber block.

Next, as also shown in FIG. 5, the thus partially dried out block 18 was placed onto a base 19, and a pressure punch 22, which was generally cylindrical, having a bottom surface 20 which was formed in a shallow spheroidal shape having a radius of curvature of about 500 mm, and having a chamfered or curvingly tapered portion 21 with a least radius of curvature of about 20 mm extending around said bottom surface 20, was pressed downwards against the central portion of said block 18 with an applied pressure of about 20 kg/cm$^2$, so as to compress said central portion of the block 18. Then, after withdrawing the punch 22 so that the compression force applied to the block 18 was released, at which time the configuration as deformed by said compression force of the block 18 did not substantially further alter, the thus compression deformed block 18 was again placed in the drying oven and the binder was completely dried, so that the configuration and shape of the block 18 were completely stabilized.

Figure 6:
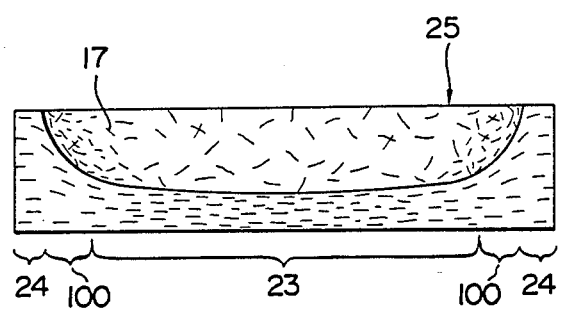
FIG. 6 is a sectional view of said embodiment of the short fiber preform according to the present invention, made from the FIG. 5 cylindrical short fiber block.

Thus, according to the fourth preferred embodiment of the method aspect of the present invention as described above, there was manufactured a short fiber preform 25 which was the fourth preferred embodiment of the preform aspect of the present invention, as shown in FIG. 6 in a sectional view. This short fiber preform 25 was made up of: a first central generally cylindrical compressed portion, denoted in FIG. 6 by the reference numeral 23, which had been compressed by about three times by the bottom surface 20 of the punch 22 and thus had thickness about 6 to 7 mm and a fiber volume proportion of about 21% (but in fact this portion 23 was somewhat more compressed and had somewhat greater fiber volume proportion towards its central portion, due to the shallow spheroidal shape of the bottom surface 20 of the punch 23); a second substantially non compressed portion, denoted in FIG. 6 by the reference numeral 24, formed as extending around the outer portion of the preform 25 as an annulus which had not been substantially compressed by the punch 22 and thus still had thickness about 20 mm and a fiber volume proportion of about 7%; and a transitional portion, denoted in FIG. 6 by the reference numeral 100, also formed as an annulus, and located intermediate between said compressed portion 23 and said non compressed portion 24, with fairly short dimension in the radial direction, which had been compressed by an amount which varied continuously along its radial dimension from about unity to about three times by the chamfered or tapered surface 21 of the punch 22 and thus had thickness varying continuously from about 20 mm to about 6 or 7 mm and a fiber volume proportion varying continuously from about 7% to about 21%. Thus, the transitional portion 100 provided a smooth and continuous and gradual transition between the compressed portion 23 and the non compressed portion 24. Absolutely no problem occurred of fracturing or of fiber disorientation in the short fiber preform 25, even in the transitional portion 100 thereof, or in the boundaries between said transitional portion 100 and the compressed portion 23 and the non compressed portion 24.

Figure 7:
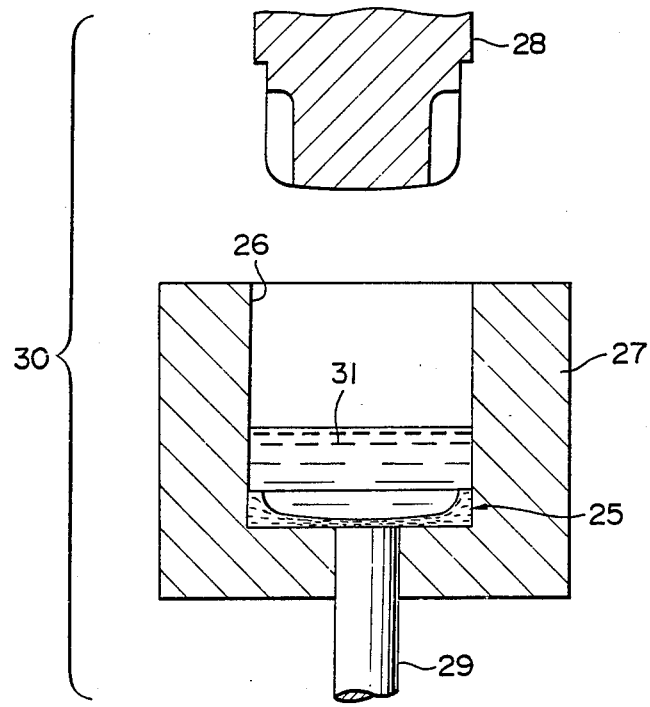
FIG. 7 is a schematic vertical sectional view taken through a high pressure casting device used for producing an engine piston including a composite material according to the present invention incorporating the preform shown in FIG. 6.

FIG. 7 is a schematic vertical sectional view taken through a high pressure casting device 30 which was used for producing an engine piston partially made of composite material incorporating the preform 25 of FIG. 6. In this figure, the reference symbol 27 denotes a casting mold, while 28 is a pressure piston and 29 is a knock out pin slidably fitted in the casting mold 27. This high pressure casting device functions as follows. The pressure piston 28 slides into a bore formed in the casting mold 27, and a mold cavity 26 is defined by this cooperation of the casting mold 27 and the pressure piston 28. When the pressure piston 28 moves downwards in the figure, it reduces the volume of the mold cavity 26, so as to apply pressure to a quantity 31 of molten metal which is being received in the mold cavity 26 as surrounding a preform 25 made of porous material previously placed in said mold cavity 26. When the quantity 31 of molten metal has solidified, the resulting cast piece is removed from the mold cavity 26, after the pressure piston 38 has been withdrawn, by the aid of the knock out 29.

Figure 8:
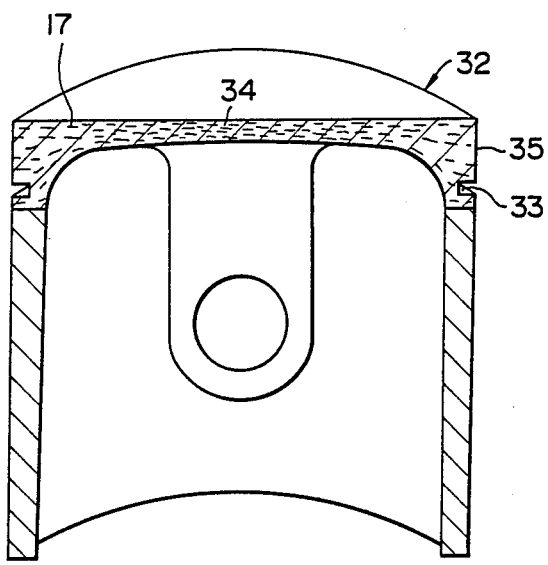
FIG. 8 is a vertical sectional view taken through said engine piston produced using the FIG. 7 high pressure casting device.

Using a high pressure casting device of the above type, an engine piston made partly of composite material according to the fourth preferred embodiment of the composite material aspect of the present invention was made as follows. After the preform 25 shown in FIG. 6, made of aluminasilica short fibers, the composition and manufacture of which have been described above, had been heated up to 600° C. at atmospheric pressure, said preform 25 was placed into the mold cavity 26 of the casting mold 27 with its concave side uppermost, and then a quantity 31 of molten metal for serving as a matrix metal, in the case of this fourth preferred embodiment being molten aluminum alloy of JIS (Japanese Industrial Standard) AC8A and being heated to about 720° C., was poured into the mold cavity 26 over and around the preform 25. Then the pressure piston 28 was forced downwards in FIG. 7, so as to pressurize the molten aluminum alloy metal mass 31 to a pressure of about 1000 kg/cm$^2$ and thus to force it into the interstices between the short alumina-silica fibers making up the preform 25. The pressure of about 1000 kg/cm$^2$ was maintained until the mass 31 of molten aluminum alloy metal was completely solidified, and then the resultant cast form was removed from the mold cavity 26 by the use of the knock out 29. Finally, this cast form was machined, so as to form a piston 32 for an internal combustion engine, as shown in sectional view in FIG. 8. As will be understood from this sectional view, the crown portion 34 of this piston 32 was constituted by composite material which included as reinforcing material the aforementioned central generally cylindrical compressed portion 23 of the preform 25, which had been compressed by about three times and had a fiber volume proportion of about 21%, while the portion 35 of this piston 32 at the top of the side thereof in which the ring groove 33 was cut during the aforementioned machining operation was constituted by composite material which included as reinforcing material the aforementioned substantially non compressed portion 24 of the preform 25, which had not been substantially compressed and had a fiber volume proportion of about 7%; and the transitional portion 100 of the preform 25, which had been compressed by an intermediate amount which varied continuously along its radial dimension from about unity to about three times and thus had a fiber volume proportion varying continuously from about 7% to about 21%, was incorporated as reinforcing material in a peripheral portion of the piston crown 34. Thus, the part of the piston 32 reinforced by the transitional portion 100 of the preform 25 provided a smooth and continuous and gradual transition between the part 34 of the piston 32 reinforced by the compressed portion 23 of the preform 25 and the part 35 of the piston 32 reinforced by the non compressed portion 24 of the preform 25.

In the case of this fourth preferred embodiment, because the portion 35 of the piston 32 in which the piston ring groove 33 was cut was made from composite material whose reinforcing fiber material had relatively low fiber volume proportion, the cutting of this groove 33 was relatively easy to accomplish, and did not involve much wear on the cutting tool; in other words, this portion 35 of the piston 32 had good machinability and workability. Further, the wear on a piston ring seated in this ring groove 33, during use of the engine piston 32, was not unduly high; in other words, this portion 35 of the piston 32 had good characteristics with regard to wear on a mating member. On the other hand, because the crown portion 34 of the piston 32 was made from composite material whose reinforcing fiber material had relatively high fiber volume proportion, said crown portion 34 had good strength and good wear resistance and good heat resistance; particularly, when comparison tests were carried out on this piston and also on an engine piston made only of aluminum alloy not reinforced with any alumina-silica short fibers, the superiority of the crown portion 34 of this engine piston 32 made as detailed above in strength and heat resistance and wear resistance were made manifest. Further, because between said crown portion 34 of the piston 32 and said side portion 35 of the piston 32 were joined by a portion of the piston 32 made from a preform portion which had a continuously varying fiber volume proportion, it was ensured that the piston 34 had no sharp boundary between its said two portions 34 and 35 with different fiber volume proportions, and further it was ensured that there was no discontinuity of the reinforcing fibers between said two portions 34 and 35 of the piston 32 with different fiber volume proportions. Thus, it was ensured that the piston 32 had good strength and good wear resistance and good heat resistance in some appropriate portions thereof, while at the same time having good workability and good machinability and good characteristics with regard to wear on a mating and cooperating member in some appropriate portions thereof. Thus the piston 32 was able to be made to be as light as possible, and, because of the smooth and continuous transition between its portions 34 and 35, thereby said piston 32, while having several parts with different fiber volume proportions as appropriate, had no sudden changes in thermal characteristics such as thermal expansion coefficient or thermal conductivity between said several parts, as well as having continuity of the reinforcing short fibers between said several parts, and accordingly was not liable to fracture when subjected to repeated load cycles or repeated hot and cold cycles.

THE FIFTH PREFERRED EMBODIMENT (ENGINE PISTON)

A quantity of short silicon carbide fibers of type "Tokamax" (this is a trademark) made by Tokai Carbon KK, of average fiber length about 125 microns and average fiber diameter about 0.3 microns, was added to a quantity of about 140 cm$^3$ of binder of colloidal silica containing about 10% of $SiO_2$, and after the mixture had been adequately stirred up a block 18 of silicon carbide fibers was formed therefrom by the compression forming method. This block 18 was of the same form as that of the fourth embodiment described above and shown in FIG. 5, being roughly cylindrical and having dimensions of about 94 mm diameter by 20 mm thickness, and had a low fiber volume proportion of about 10%. Next, also as in the fourth preferred embodiment described above and shown in FIG. 5, the block 18 was placed onto a base 19, and a pressure punch 22 of the same general configuration as before was pressed downwards against the central portion of said block 18, this time however with a very high applied pressure of about 150 kg/cm$^2$, so as to compress said central portion of the block 18. Then, after withdrawing the punch 22 so that the compression force applied to the block 18 was released, at which time the configuration as deformed by said compression force of the block 18 did not substantially further alter, the thus compression deformed block 18 was placed in a drying oven and the binder was completely dried, so that the configuration and shape of the block 18 were completely stabilized.

Thus, according to the fifth preferred embodiment of the method aspect of the present invention as described above, there was manufactured a short fiber preform 25 which was the fifth preferred embodiment of the preform aspect of the present invention, like that of the fourth preferred embodiment shown in FIG. 6. This short fiber preform 25 again was made up of: a first central generally cylindrical compressed portion 23 which had been compressed by about three times by the button surface 20 of the punch 22, and thus had thickness about 6 to 7 mm and a fiber volume proportion of about 30% (again in fact this portion 23 was somewhat more compressed and had somewhat greater fiber volume proportion towards its central portion, due to the shallow spheroidal shape of the bottom surface 20 of the punch 23); a second substantially non compressed portion 24, formed as extending around the outer portion of the preform 25 as an annulus which had not been substantially compressed by the punch 22 and thus still had thickness about 20 mm and a fiber volume proportion of about 10%; and a transitional portion 100, also formed as an annulus, and located intermediate between said compressed portion 23 and said non compressed portion 24, with fairly short dimension in the radial direction, which had been compressed by an amount which varied continuously along its radial dimension from about unity to about three times by the chamfered or tapered surface 21 of the punch 22 and thus had thickness varying continuously from about 20 mm to about 6 or 7 mm and a fiber volume proportion varying continuously from about 10% to about 30%. Thus, again, the transitional portion 100 provided a smooth and continuous and gradual transition between the compressed portion 23 and the non compressed portion 24. Again, absolutely no problem occurred of fracturing or of fiber disorientation in the short fiber preform 25, even in the transitional portion 100 thereof, or in the boundaries between said transitional portion 100 and the compressed portion 23 and the non compressed portion 24.

Using a high pressure casting device of the FIG. 7 an engine piston made partly of composite material according to the fifth preferred embodiment of the composite material aspect of the present invention was made as follows. After the preform 25 shown in FIG. 6, made of silicon carbide short fibers, the composition and manufacture of which have been described above, had been heated up to 800° C. at atmospheric pressure, said preform 25 was placed into the mold cavity 26 of the casting mold 27 with its concave side uppermost, and then a quantity 31 of molten metal for serving as a matrix metal, in the case of this fifth preferred embodiment being molten magnesium alloy of JIS (Japanese Industrial Standard) AZ91A and being heated to about 650° C., was poured into the mold cavity 26 over and around the preform 25. Then the pressure piston 28 was forced downwards in FIG. 7, so as to pressurize the molten magnesium alloy metal mass 31 to a pressure of about 1000 kg/cm$^2$ and thus to force it into the interstices between the short silicon carbide fibers making up the preform 25. The pressure of about 1000 kg/cm$^2$ was maintained until the mass 31 of molten magnesium alloy metal was completely solidified, and then the resultant cast form was removed from the mold cavity 26 by the use of the knock out 29. Finally, this cast form was machined, so as to form a piston 32 for an internal combustion engine, again of the type as shown in sectional view in FIG. 8. Again, the crown portion 34 of this piston 32 was constituted by composite material which included as reinforcing material the aforementioned central generally cylindrical compressed portion 23 of the preform 25 which had been compressed by about three times and had a fiber volume proportion of about 30%, while the portion 35 of this piston 32 at the top of the side thereof in which the ring groove 33 was cut during the aforementioned machining operation was constituted by composite material which included as reinforcing material the aforementioned substantially non compressed portion 24 of the preform 25 which had not been substantially compressed and had a fiber volume proportion of about 10%; and the transitional portion 100 of the preform 25, which had been compressed by an intermediate amount which varied continuously along its radial dimension from about unity to about three times and thus had a fiber volume proportion varying continuously from about 10% to about 30%, was incorporated as reinforcing material in a peripheral portion of the piston crown 34. Thus, again, the part of the piston 32 reinforced by the transitional portion 100 of the preform 25 provided a smooth and continuous and gradual transition between the part 34 of the piston 32 reinforced by the compressed portion 23 of the preform 25 and the part 35 of the piston 32 reinforced by the non compressed portion 24 of the preform 25. Again, in the case of this fifth preferred embodiment, because the portion 35 of the piston 32 in which the piston ring groove 33 was cut was made from composite material whose reinforcing fiber material had relatively low fiber volume proportion, the cutting of this groove 33 was relatively easy to accomplish and did not involve much wear on the cutting tool; in other words, this portion 35 of the piston 32 had good machinability and workability. Further, the wear on a piston ring seated in this ring groove 33, during use of the engine piston 32, was not unduly high; in other words, this portion 35 of the piston 32 had good characteristics with regard to wear on a mating member. On the other hand, because the crown portion 34 of the piston 32 was made from composite material whose reinforcing silicon carbide whisker fiber material had relativley high fiber volume proportion, said crown portion 34 had vastly improved strength and wear resistance and heat resistance, as compared to a piston formed only of magnesium alloy with no reinforcing silicon carbide whiskers. Further, because between said crown portion 34 of the piston 32 and said side portion 35 of the piston 32 were joined by a portion of the piston 32 made from a preform portion which had a continuously varying fiber volume proportion, it was again ensured that the piston 34 had no sharp boundary between its said two portions 34 and 35 with different fiber volume proportions, and further it was ensured that there was no discontinuity of the reinforcing fibers between said two portions 34 and 35 of the piston 32 with different fiber volume proportions. Thus, it was ensured that the piston 32 had good strength and good wear resistance and good heat resistance in some appropriate portions thereof, while at the same time having good workability and good machinability and good characteristics with regard to wear on a mating and cooperating member in some other appropriate portions thereof. Thus the piston 32 was able to be made to be as light as possible, and, because of the smooth and continuous transition between its portions 34 and 35, thereby said piston 32, while having several parts with different fiber volume proportions as appropriate, had no sudden changes in thermal characteristics such as thermal expansion coefficient or thermal conductivity between said several parts, as well as having continuity of the reinforcing short fibers between said several parts, and accordingly was not liable to fracture when subjected to repeated load cycles or repeated hot and cold cycles.

THE FIRST SET OF COMPARISON EXAMPLES

Figure 9:
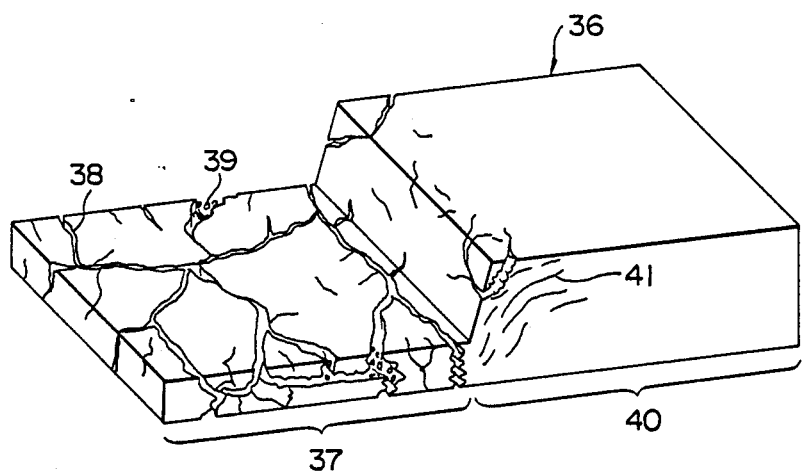
FIG. 9 is a perspective view of a compressed block of short fiber material, which is not an embodiment of the present invention and which has been compressed after having been completely dried, showing numerous cracks and fractures and disintegrated portions generated by the compression process which made said block unsuitable for composite reinforcement.

Using the same suction forming method as employed in the case of the first preferred embodiment detailed above, a block was formed of alumina short fibers, having dimensions 200 mm by 80 mm by 30 mm thickness, and by keeping this block in a drying furnace at a temperature of about 150° C. for about 5 hours the binder in which the fibers were soaked was completely dried; thu a cuboidal short fiber block 36 was formed of alumina short fibers. Next, the short fiber block 36 was compression formed in the same way as in the first preferred embodiment; however, as shown in FIG. 9 in a perspective view, in the compressed portion 37 of the block 36 there were generated many cracks and fractures 38 and crumbled portions 39, and even in the non compressed portion 40 of the block 36 there were generated numerous cracking fractures 41. (In FIG. 9, the actual fibers themselves are not shown, in the interests of clarity). Thus, this compressed block was quite unsuitable as a preform for a composite material. The same phenomenon was seen to occur also when the material used for the block 36 was carbon short fibers, potassium titanate short fibers, and silicon carbide whiskers.

Thereby, it is seen that it is not possible to perform the step of compressing or changing the shape of the short fiber block, after the binder solution permeating said block has been completely dried, because in such a case the binder becomes hard and the shape of the block becomes essentially determinate.

THE SECOND SET OF COMPARISON EXAMPLES

Using two quantities of alumina-silica short fibers of the same type as used in the fourth preferred embodiment detailed above, in one case about 32.3 gm and in the other case about 46.1 gm, two piston rough casts were made in the same way as in the case of said fourth preferred embodiment: each of these quantities of alumina-silica short fibers was mixed with about 300 cm$^3$ of colloidal silica binder containing about 10% by weight of SiO$_2$, and then was formed into a short fiber block by compression forming, said block being of the form of the preform of the fourth preferred embodiment but being of uniform fiber volume proportion. Then, these blocks were completely dried in a drying oven. Thus, two different preforms (which were not according to the present invention) were manufactured, each of the shape of the FIG. 6 preform, and having respective relatively high fiber volume proportions of 14% and 20%.

These two preforms were then cast in a high pressure casting apparatus of the FIG. 7 type, using a preheating temperature of about 700° C., and thus two rough cast pistons were formed. These piston rough casts were then machined, to form two engine pistons of the same external dimensions as the FIG. 8 piston; but, as compared to the case of the fourth preferred embodiment described above, great difficulty was experienced in machining the piston ring grooves, because of the high fiber volume proportion of the composite material in these portions thereof, and the wear on the machining tool was very high. Accordingly, it was verified that a composite material which has a relatively high volume proportion of reinforcing fibers is not very suitable for being machined, and has poor workability and machinability, although it has a very good strength and heat resistance and wear resistance. It was also considered that in this comparison example the wear amount on a piston ring fitted in the ring groove during use of the piston would be very high, due to the poor characteristics of such a composite material with a relatively high volume proportion of reinforcing fibers with respect to wear on a mating member.

THE THIRD COMPARISON EXAMPLE

Figure 10:
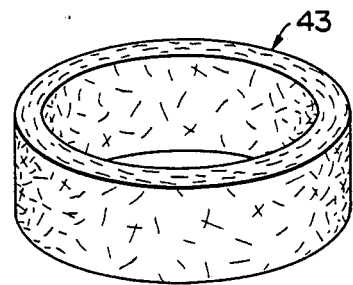
FIG. 10 is a perspective view of a hollow cylindrical preform, which has relatively low fiber volume proportion and is not an embodiment of the present invention, used for providing composite reinforcement for the side portion of a piston which is a comparison example for demonstrating the merits of the present invention.
Figure 11:
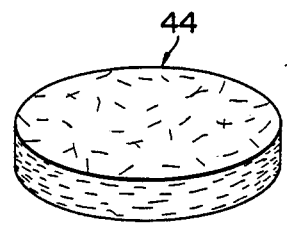
FIG. 11 is a perspective view of a cylindrical disk shaped preform, which has relatively high fiber volume proportion and is not an embodiment of the present invention, used for providing composite reinforcement for the crown portion of said comparison example piston.

Using alumina-silica short fibers of the same type as used in the fourth preferred embodiment detailed above, two preforms were made in the following way: these alumina-silica short fibers were mixed with a colloidal alumina binder containing about 10% by weight of $Al_2O_3$, and then, after the mixture had been adequately stirred up, there were formed by suction forming two blocks of the shapes shown in FIGS. 10 and 11; and then these blocks were heated for some time in a drying oven so as to completely dry the binder permeating them. Thus, two different preforms (which were not according to the present invention) were manufactured. In detail, one of these preforms 43, shown in FIG. 10 in a perspective view, was formed as a hollow cylinder, having the dimensions of internal diameter about 80 mm, external diameter about 94 mm, and length about 20 mm, and this preform had a relatively low fiber volume proportion of 7%; while the other of these preforms, shown in FIG. 11 in a perspective view, was formed as a solid cylindrical disk, having dimensions of diameter 80 mm and thickness 7 mm, and with a relatively high fiber volume proportion of 20%.

Figure 12:
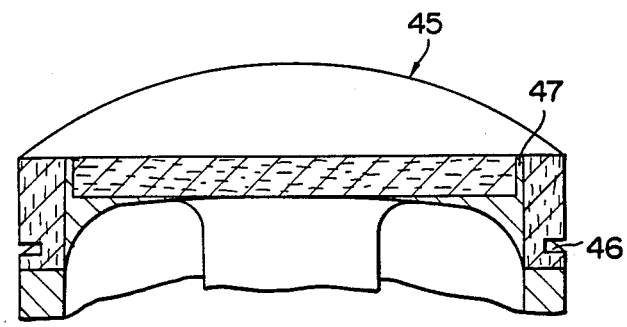
FIG. 12 is a vertical sectional view taken through the upper part of said comparison example piston.

These two preforms were then assembled together for casting in a high pressure casting apparatus of the FIG. 7 type, with the disk shaped preform 44 located in the opening of the cylindrical preform 43, and, under the same conditions as in the case of the fourth preferred embodiment described above, a rough cast piston 45 was formed. This piston rough cast was then machined, to form an engine piston of the same external dimensions as the FIG. 8 piston; the upper portion of this piston is shown in sectional view in FIG. 12. Naturally, processing by machining of the piston ring groove 46 of this piston presented no more difficulty than in the case of the piston of the fourth preferred embodiment described above, since the fiber volume proportion of the relevant part of the rough cast piston was the same; but, as shown in FIG. 12, since there was a portion 47 of the piston formed only of aluminum alloy, intermediate between the side portion of the piston which was composite reinforced by the preform 43 of relatively low fiber volume proportion and the crown portion of the piston which was composite reinforced by the preform 44 of relatively high fiber volume proportion, a very weak point was created thereby; and it was verified that this portion had inferior strength and heat resistance characteristics, as compared with other portions of the piston. Accordingly, it was verified that a reinforcing preform made in two separate portions of different fiber volume proportions introduces severe weaknesses and stress points into the parts made from the resulting composite material.

THE FOURTH COMPARISON EXAMPLE

A piston was made in the same way as in the third comparison example detailed above, but omitting the hollow cylindrical preform 43, so that only the crown portion of the piston was made of composite material including short alumina-silica fiber reinforcement. Since in this case the side portion of the piston is not composite reinforced at all, naturally the processing by machining of the piston ring groove of this piston presented very little difficulty; but the wear resistance of the outer surface of the cylindrical wall of the piston and of the ring groove wall of the piston were extremely low as compared with the piston of the fourth preferred embodiment described above.

Further, when heat impact tests were carried out on the piston of the fourth preferred embodiment and also on this piston of the fourth comparison example, a favorable result was obtained in the case of the piston of the fourth preferred embodiment, while by contrast in the case of the piston of this fourth comparison example a fracture occurred at the boundary between its crown portion reinforced by alumina-silica short fibers and the non reinforced portion.

Similar tests were also conducted using carbon short fibers, silicon carbide whiskers, and potassium titanate whiskers, and it was confirmed that in the case where a short fiber preform was used in which the volume proportion of a particular portion was higher than the volume proportion of other portions, and where the volume proportion decreased continuously and gradually from the particular portion to other portions, with no discontinuity in the short fibers between these portions, according to the present invention, a composite material was obtained of clearly superior heat impact characteristics as compared to the case where a short fiber preform was used in which the fiber volume proportion was high over the entire form.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow:

What is claimed is:

1. A method for making a composite material wherein a matrix material selected from the group consisting of magnesium alloy and aluminum alloy is reinforced by fibers embedded therein, and wherein said method comprises:
   a) preparing a mass of a mixture of fibers selected from the group consisting of alumina, carbon, potassium titanate, alumina-silica and silicon carbide fibers and an inorganic binder of silica or alumina, said binder being in such a partially dried condition that said mass is uniformly deformable under compression;

b) compressing a portion of said mass with said binder being in said partially dried condition so as to increase the density of said fibers in said portion from that in the remainder of said mass, and wherein for said compression, a first portion of the moist mass is substantially compressed, a second portion of the moist mass is compressed to a relatively low extent, and a third portion, joining between said first portion and said second portion, is compressed by an amount which changes substantially continuously from the portion adjoining to said first portion to the portion adjoining to said second portion;

c) drying said mass to harden said binder;

d) infiltrating under pressure a molten alloy selected for said matrix into interstices of said mass to fill said interstices while substantially maintaining a fiber work structure of said mass under the binding force of said binder; and e) solidifying said molten alloy with said fiber work structure of said mass being embedded in the matrix of said alloy.

2. A method according to claim 1, wherein in step (b) said remainder of said moist mass is not substantially compressed.

3. A method according to claim 1, wherein in step (b) said binder is partially hardened.

4. A method according to claim 1, wherein in step (c) said binder is hardened by heating said moist mass.

5. A method according to claim 1, wherein during at least a part of step (c) the compression of said moist mass performed in step (b) is kept applied.

6. A method according to claim 1, wherein, before the commencement of step (c), the compression of said moist mass performed in step (b) is released.

7. A method according to claim 1, further comprising the step, performed between step (a) and step (b), of incising a slot in the surface of said moist mass.

8. A method according to claim 7, wherein said slot extends generally along the boundary between said proper portion of said moist mass which is more compressed in step (b) and said remainder thereof which is not so much compressed.

9. A method according to claim 1, wherein said compression of said moist mass in step (b) is performed by means of a pressing member.

10. A method according to claim 9, wherein said pressing member is formed with a sloping edge portion.

11. A method according to claim 9, wherein during step (b) the main portion of said pressing member compresses and defines said proper portion of said moist mass, and said sloping edge portion of said pressing member compresses and defines a transitional portion of said moist mass joining between said proper portion of said moist mass and said remainder of said moist mass, the compression amount of said transitional portion changing substantially continuously from its portion adjoining to said proper portion of said moist mass to its portion adjoining to said remainder of said moist mass.

12. A method according to claim 11, wherein said sloping edge portion of said pressing member is substantially straight.

13. A method according to claim 11, wherein said sloping edge portion of said pressing member is substantially circular.

* * * * *